United States Patent [19]
Griffin

[11] Patent Number: 4,992,709
[45] Date of Patent: Feb. 12, 1991

[54] SWITCHING CIRCUIT PROVIDING ADJUSTABLE CAPACITIVE SERIES VOLTAGE DROPPING CIRCUIT WITH A FRACTIONAL HORSEPOWER MOTOR

[75] Inventor: Raymond T. Griffin, San Antonio, Tex.

[73] Assignee: Lightolier, Inc., Secaucus, N.J.

[21] Appl. No.: 368,659

[22] Filed: Jun. 20, 1989

[51] Int. Cl.$^5$ .................................................. H02P 7/00
[52] U.S. Cl. ...................................... 318/249; 318/66; 388/839
[58] Field of Search ........................ 318/11, 54, 55, 59, 318/66, 125, 146, 249, 256, 257, 268, 287, 508, 267, 509; 388/832, 833, 838, 839, 841, 855, 917; 361/23, 31

[56] References Cited

U.S. PATENT DOCUMENTS

| | | | |
|---|---|---|---|
| 3,562,616 | 2/1971 | Elliott | 388/839 X |
| 3,737,761 | 6/1973 | Walther | 307/130 |
| 3,896,355 | 7/1975 | Guicheteau | 318/207 |
| 3,940,634 | 2/1976 | Grogan | 307/252 |
| 4,007,378 | 2/1977 | Lazzara | 307/112 |
| 4,052,625 | 10/1977 | Cameron | 361/31 X |
| 4,118,658 | 10/1978 | Salva et al. | 318/257 |
| 4,250,437 | 2/1981 | Morton et al. | 386/829 X |
| 4,352,993 | 10/1982 | Hannas | 307/112 |
| 4,584,506 | 4/1986 | Kaszmann | 318/696 X |
| 4,670,699 | 6/1987 | Yang | 318/814 |
| 4,748,532 | 5/1988 | Commander et al. | 361/31 |

OTHER PUBLICATIONS

Nasar, ed., Hdbk. of Elec. Machines, 1987, pp. (6-4)-(6-11).
Chapman, Elec. Machinery Fundamentals, 1985, pp. 536-547.
McPherson, An Intro. to Elec. Mach. & Transfs., pp. 445-449.
Whitney, IBM Tech. Disc. Bulletin, vol. 9, No. 4, 1966, p. 350.

Primary Examiner—William M. Shoop, Jr.
Assistant Examiner—A. Jonathan Wysocki
Attorney, Agent, or Firm—Dennis T. Griggs

[57] ABSTRACT

A control circuit for a fractional horsepower fan motor connected between hot and neutral wires in and AC circuit is shown. The control circuit includes two or more duplicate branches. Each branch is serially connected, and each branch includes a triac, series resistor and series capacitor. The triac has a gate terminal which is connected to an optical coupling circuit for isolation and responds to a control signal from a low voltage small current source. In an alternative embodiment, a single triac and optical coupling circuit can be used with different capacitors being switched in or out of the circuit.

15 Claims, 1 Drawing Sheet

SWITCHING CIRCUIT PROVIDING ADJUSTABLE CAPACITIVE SERIES VOLTAGE DROPPING CIRCUIT WITH A FRACTIONAL HORSEPOWER MOTOR

BACKGROUND OF THE DISCLOSURE

This disclosure is directed to a circuit which varies the speed of a small motor. It is particularly intended for use with ceiling fans to vary the motor speed and hence the rate that air is moved by the ceiling fan. A ceiling fan is ordinarily operated at discrete speeds. The operation of a ceiling fan usually involves switching off and on with a main power switch. Many ceiling fans remain installed for many years of operation where the switch additionally includes a large and rather bulky series rheostat. It provides an adjustable voltage to the ceiling fan which changes the motor speed.

The present apparatus is intended to provide a retrofit to this type of equipment and particularly eliminates the large rheostat. In general terms, a rheostat is an energy wasting device. Further, it is a device which has some hazard in operation. It requires a contact to sweep across the coils thereby creating a potential hot spot and further creating a potentially electrically noisy operation. A ceiling fan typically is left in a particular condition for hours. That is, it is set at a particular speed and permitted to operate at that speed for many hours. The present apparatus is a switching system which places a series impedance in the circuit to thereby decrease the terminal voltage at the fractional horsepower motor and decrease motor speed.

It is well known to utilize starting capacitors with motors to control operation. Also, small motors are often constructed with starting circuits which drop out once speed has been achieved. It is, however, difficult to switch capacitors into a circuit for powering a motor without requiring a mechanical make/break switch via a relay or an on/off switch. The motor reflects an inductive load, and this will tend to suppress initial peak transients. When switching a capacitor into an electric motor circuit, there is always the risk of transient generation where the transient is of either polarity and of such amplitude that it may weld the contacts of a relay together or eventually the contacts will wear out. Mechanical contacts are not as reliable as solid state devices. Transient amplitude can easily be five or ten times greater than the nominal peak voltage. In light of this risk, switched series capacitors for controlling speed of a fan motor have not been desirable in the past.

Prior art devices include various and sundry motor controllers. For instance, U.S. Pat. No. 3,896,355 is a series triac motor control circuit. However, it does not incorporate series capacitors, and moreover, it shows a motor controller where the triacs are connected to different motor windings. It is similar to the IBM TDB Volume 9, No. 8 which shows series triacs again connected to different coils of a motor. U.S. Pat. No. 4,751,451 sets out a manually controlled variable capacitor switching approach, the manual control being implemented by hand insertion of a prepackaged pin equipped device into a socket. U.S. Pat. No. 4,670,699 is a similar hand controlled capacitor switching device. U.S. Pat. No. 4,352,993 is another hand switched type device. U.S. Pat. No. 4,007,378 shows the general idea of replacing a relay with a triac. U.S. Pat. No. 3,940,634 includes a triac which is serially connected. A relatively complex control system is provided for that. U.S. Pat. No. 3,737,761 shows a triac and capacitor in parallel so that the triac defeats the capacitor. It is connected also with a triac control circuit.

In general, the references mentioned above do not set forth a fractional horsepower fan motor control circuit of the sort found in the present disclosure and as described in the claims appended to the present disclosure.

The present disclosure is directed, however, to a switching circuit arranged in series with the fractional horsepower fan motor, there being duplicate circuits each providing similar but different sized capacitors. Each capacitor is switched into and out of the circuit by a triac in series therewith. The several triacs are each provided with control signals through an optical coupler. The optical coupler is provided with a control signal. Thus, with two capacitors, four different values of capacitance can be provided to provide four different speeds for the motor, one speed switching the motor off. If three different capacitors are used, eight speeds can be provided and if four capacitors are used, sixteen speeds can be provided.

Accordingly, the triac control of a series capacitor under the direction of an optical coupling circuit provides a neatly packaged retrofit device for incorporation in a motor controlled system which avoids the rheostat and yet provides variable speeds. Another alternate use of the present apparatus is as original equipment in a motor control circuit. The control signal which is provided is a low voltage switching signal, typically a DC level. It provides a continuous on/off signal to the triac and, therefore, is able to accomplish the desired control without contact closure where the contacts are required to handle the motor current. Also, the control system can be turned on/off from a remote controller by turning the triac(s) gate signal on or off.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are, therefore, not to be considered limiting of its scope, for the invention may admit to other equally effective embodiments.

DETAILED DESCRIPTION OF THE PREFERRED EMBODIMENT

Figure 1:
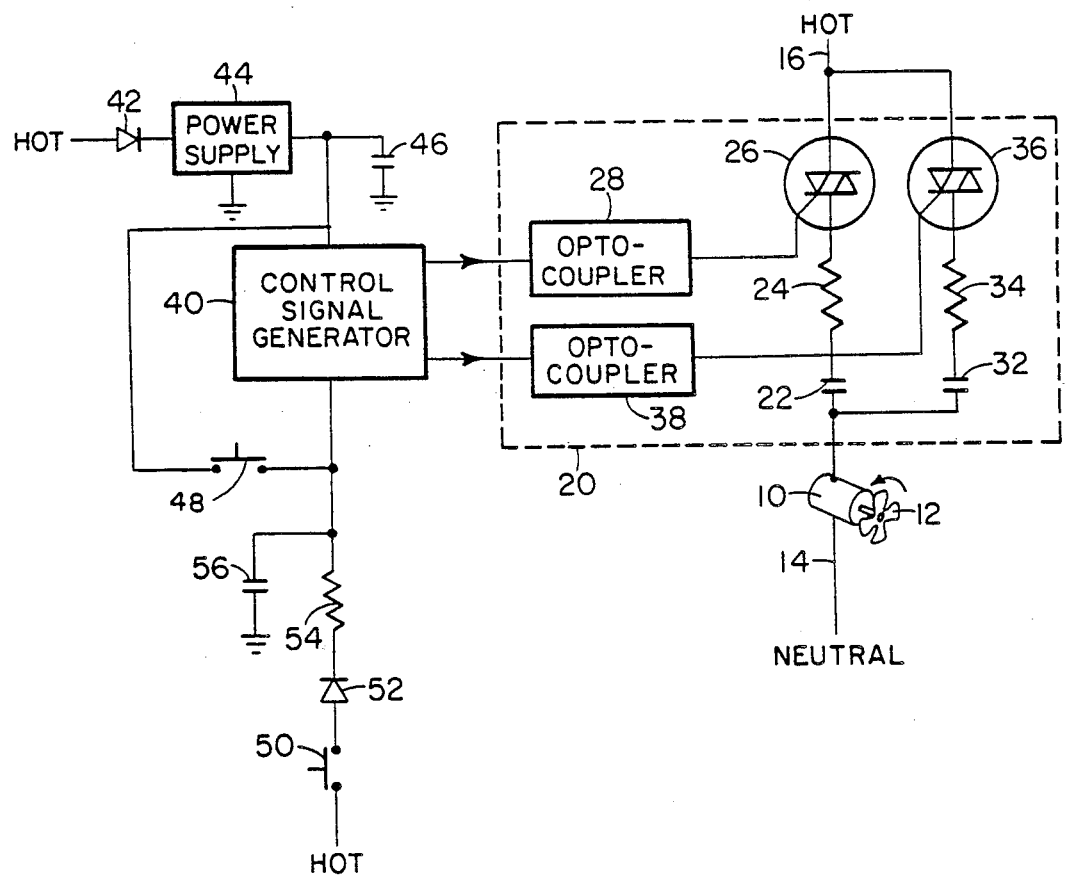
FIG. 1 is a schematic wiring diagram showing a fan motor subjected to control by imposing selected values of series capacitors between the hot and neutral wires to thereby change terminal voltage for the motor wherein the control circuit provides series triacs subjected to control by optical coupling circuits.

Attention is directed to FIG. 1 which shows a fan motor 10 for rotation of a ceiling fan 12. The motor is provided with electrical current flowing between a pair of conductors, one being identified as the neutral wire 14, and the other being the hot wire 16. This two-wire power supply system is typical of that found in most existing fan installations. The fan 10 is a fractional horsepower motor typically suspended from a ceiling. The motor typically supports the blade 12 ordinarily having between three and five blades and having a diameter of about three feet. It is used for cooling and provides continual air movement and is normally left at a particular speed for many hours.

The motor speed controller 20 of the present disclosure is enclosed within the dotted line. It is installed between the motor 10 and the hot wire 16. It is ideally located within the circular housing or shell which encloses the motor 10. This is normally constructed around the motor so that all the equipment within the dotted line at 20 is located at or adjacent to the motor. Thus, the electrical connections which are shown within the dotted line 20 are relatively short.

A capacitor 22 is connected in series with the motor 10. There is also a small series resistor 24 serially connected with the motor. (In many configurations, the resistor 24 may not be required.) In turn, that is connected to a triac 26. It has a control gate lead which will be discussed in detail hereinbelow.

A duplicate capacitor 32 and control circuitry is also shown. The capacitor 32 is similar to the capacitor 22. There is also a series resistor 34 and triac 36. The triac 26 is connected with an optocoupler 28 while the triac 36 is connected with a similar optocoupler 38.

This arrangement shows two capacitors. It obviously can be extended to three or four capacitors, or even reduced to a single capacitor being switched in or out of the circuit. While the number of capacitors can be increased, the benefit is marginal because the number of settings for motor speed can be increased to a large number, but there is no particular demand for that kind of fine motor control. In any event, one capacitor will provide two speeds; two capacitors will provide four speeds; three capacitors will provide eight speeds; and four capacitors will provide sixteen speeds.

The value of the capacitor can vary, but if there are two only, the two capacitors are typically about 1:2 in capacitance. With three or four capacitors, they might have values bearing a relationship of 1:3:6:11 or 1:2:5:9. The discussion below will focus on only a two capacitor system, but this can be extended. In the two capacitor system assuming the capacitors 22 and 32 have a ratio of 1:2, then four settings can be provided. Obviously, one setting switches the motor off because all the capacitors have been switched out of the circuit.

A control signal generator 40 is incorporated and provides control signals to the optocoupler circuits. These circuits are switched with low voltage signals, typically in the range of about zero to five volts DC. A typical optocoupler utilizes a light emitting diode which is physically spaced from a photothyristor. Typically, the photothyristor responds to the light level from the light emitting diode to provide a gate control input which varies the current flow through the photothyristor. Such devices are believed to be well known. The circuit shows identical triac circuits which are side by side silicon control rectifiers (SCR) thus comprising the triac. So to speak, one SCR is operative in the other half of the voltage cycle. This provides sustained SCR control even though the AC signal on the hot wire 16 continuously reverses current flow in the expected fashion.

The present arrangement takes advantage of the fact that parallel capacitive values add so that when both the capacitors 22 and 32 are switched into the circuit, then the effective impedance is determined by the sum of the two capacitors 22 and 32. The two capacitors 22 and 32 are switched into the circuit under separate controls. Thus, one may be in and the other may be out. Assuming for the moment that both are switched in, the two capacitors provide the maximum capacitive. This switching of capacitors in and out of the circuit changes the series impedance between the hot wire 16 and the neutral wire 14. As switching occurs, transients may or may not be created. Assume that the motor 10 is running at a particular initial speed and a signal is applied to one or both of the triacs 26 and 36 to change the operative state of the system. When this occurs, there is a tendency to create a switching transient. Because switching occurs in a random relationship to the peak AC voltage, the amplitude and polarity of the switching transit is simply unknown. It could be a very small transient, but it could be quite large. In either case, the switching transient is reflected into the series circuit. The switching transient is somewhat damped by the series resistors 24 and 34 and may well be damped also as the capacitors 22 and 32 are charged after switching (assuming they were not previously charged). The switching transient thus is attenuated in some measure and provides less risk to the running gear. The same would also be true when switching the capacitors 22 and/or 32 out of the circuit. That is, a transient may occur when switching to remove or to delete one of the capacitors 22 and 32 from operation in the circuitry. This switching again can be accomplished quite readily without running the risk of damage to the capacitors 22 or 32 in the circuit.

The control signal generator 40 can be located either at the fan motor 10 or elsewhere. It is a relatively small device, and can even be as small as a battery with a SPST switch for each capacitor. It is required only to provide a very small current flow, typically in the range of several microamperes or a few milliamperes. For instance, a disposable battery with a nominal terminal voltage of nine volts can be used; batteries as small as one and one half volts can also be used. They will provide an adequate current through a SPST switch which will function through the optocoupler circuit for the necessary signal isolation and amplification. This will provide an adequate sustained current at the triacs 26 and 36 for their continued operation. In the foregoing example, the control signal generator 40 therefore includes a small battery, and a SPST switch for each of the optocoupling circuits 28 or 38. Thus, if there are two capacitors 22 and 32 to be switched, two switches are required. As a result of this mode of controlling, the control signal is separate from the current which is furnished to the motor 10, and the control signal can be generally then described as a low voltage low power switching signal in contract with the power furnished to the fan motor 10.

While the control signal generator 40 has been described as possibly being battery operated, it may also be operated off a lot line of a normal 210 volts AC. If the control signal generators operates off a hot line, it would have an input diode 42 feeding 120 volts AC through a power supply 44 to the control signal generator 40. A capacitor 46 would help smooth out the voltage being supplied to the control signal generator 40. While the particular configuration of the control signal generator 40 is not shown, it may be a standard electronic control circuit that simply selects which optocoupler 28 and/or 30 is being energized.

Also, the control signal generator 40 may be operated in three way environment. For example, a momentary contact switch 48 may be located on one wall of the room. When the momentary contact switch 48 is pushed, the hot line will be connected to the control signal generator 40. Depending upon how long the momentary switch 48 is held down, will determine which of the optocouplers 28 and/or 30 will be energized. To provide a three way connection, in parallel with the momentary switch 48 to the hot line is connected a second momentary switch 50. Momentary switch 50 may be located on another wall to provide in essence a three way control. To prevent feedback of power from a momentary switch 48, diode 52 and resistor 54 are connected in series with momentary switch 50. Again, capacitor 56 provides filtering to prevent noise spikes.

Figure 2:
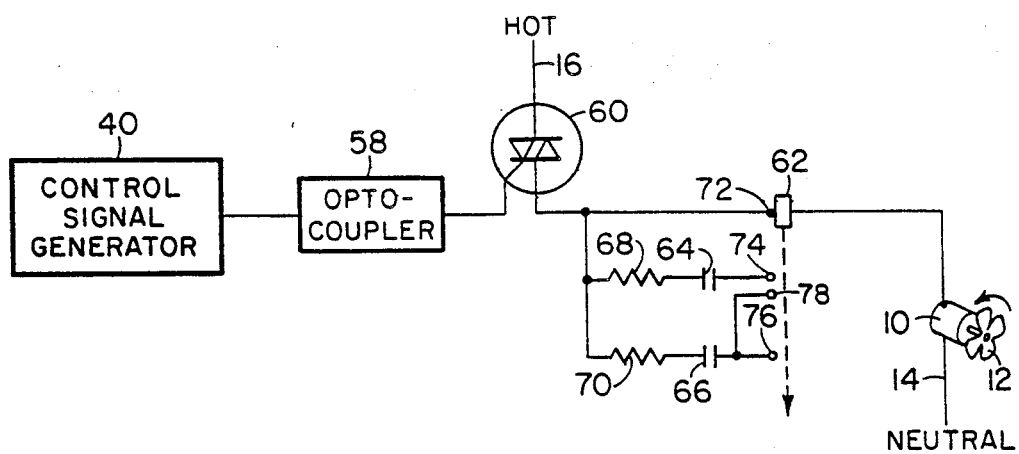
FIG. 2 is an alternative schematic wiring diagram.

FIG. 2 shows an alternative embodiment for the present invention. The same type of control signal generator 40 may be utilized in connection with a single optocoupler 58. Optocoupler 58 provides the gating for the single triac 60. This time the fan motor 10 of the fan 12 connects through a shorting contact 62 and triac 60 to the hot line 16. The shorting contact 62 may switch in and out capacitors 64 and 66 along with their current limiting resistors 68 and 70. This is accomplished by moving the shorting contact 62 from contact point 72, to contact point 74, to a combination of contact points 74 and 78, and to contact point 76.

When the fan motor 10 is connected through shorting contact 60 with contact point 70, full power is being delivered to the fan motor. However, when fan 10 is contacted through shorting contact 62 with contact points 74 and 75, capacitors 64 and 65 have now been switched into the circuit. This will cause the fan 12 to turn at a slower speed than when shorting contact is in an electrical connection with shorting point 72. However, once shorting contact 62 has been switched down to shorting contact 76, capacitor 66 has a greater impedance than capacitor 64. Therefore, it will cause an even slower speed of the fan 12 than was caused when shorting contact 62 was in electrical connection with shorting points 74 and 78. When shorting contact 62 is in electrical connection with both shorting contacts 74 and 78, capacitors and 64 and 66 are connected in parallel.

It should be realized that FIG. 2 of the invention has some of the disadvantages that are associated with sliding contacts. These disadvantages include the possible sticking of contacts, but FIG. 2 may be a more economical alternative than FIG. 1.

While the foregoing is directed to the preferred embodiment, the scope thereof is determined by the claims which follow.

What is claimed is:

1. For use in combination with a fractional horsepower alternating current motor connected between hot and neutral wires to impose a series impedance reducing the voltage applied to the motor, a motor control system which comprises:
    (a) at least two independent parallel capacitors connected in series with a motor and connected in series with the hot wire for conducting alternating current power to the motor;
    (b) first and second switching devices, each thereof being connected in series with one of said capacitors, wherein said switching devices conduct alternating current flowing between the hot and neutral wires and are controllably switched between off and on states to thereby control alternating current flow through the respectively connected capacitors; and
    (c) control means connected to said switching devices for providing control signals to said switching devices to selectively switch said switching devices to the on state and the off state.

2. The apparatus of claim 1 wherein said switching devices are solid state devices.

3. The apparatus of claim 2 wherein said solid state devices are triacs.

4. The apparatus of claim 3 wherein said triacs are connected so that a single triac switches a single capacitor.

5. The apparatus of claim 1 wherein said capacitors have capacitance in the ratio of about 1:2.

6. The apparatus of claim 1 wherein said switching devices are solid state circuit components having control terminals thereon, and said control means includes circuits which have infinite input impedance between the input and output thereof.

7. The apparatus of claim 6 wherein said circuits are optical coupling circuits.

8. The apparatus of claim 7 wherein said optical circuits connect with a switched DC voltage source of relatively low voltage and relative small current.

9. The apparatus of claim 8 including a series resistor connected serially with each of said capacitors.

10. The apparatus of claim 1 including a series resistor connected serially with each of said capacitors.

11. The apparatus of claim 10 wherein said solid state devices are triacs having control gates connected to said control means.

12. The apparatus of claim 11 wherein said control means include infinite input circuits.

13. The apparatus of claim 1 wherein said control means may be triggered from two separate locations by triggering means for the providing of control signals to said switching devices.

14. An apparatus for varying impedance to a small alternating current motor, such as a fan motor, to vary speed of the small motor when the small motor is connected to a source of alternating current power comprising:
    first switching means for connecting said source of power therethrough to said small motor;
    second switching means for connecting between at least two different paths, said second switching means being connected between said small motor and said source of power;
    first capacitor means in at least one of said different paths for increasing impedance therethrough to decrease the speed of said small motor when said second switching means selects the path including the first capacitor means; and
    control means operatively connected to said first switching means for providing a control signal to operate said first switching means.

15. The apparatus as recited in claim 14 wherein there are at least three said different paths provided by said second switching means, each of said different parallel paths having a different impedance provided by at least said first capacitor means and second capacitor means being switched in and out between said small motor and said source of power.

* * * * *

UNITED STATES PATENT AND TRADEMARK OFFICE
CERTIFICATE OF CORRECTION

PATENT NO. : 4,992,709

DATED : 02/12/91

INVENTOR(S) : Raymond T. Griffin

It is certified that error appears in the above-identified patent and that said Letters Patent is hereby corrected as shown below:

Column 4, line 56, "generators" should be -- generator --.

Column 4, line 66, "in three way" should be -- in a three way --.

Signed and Sealed this

Thirtieth Day of June, 1992

*Attest:*

DOUGLAS B. COMER

*Attesting Officer*   Acting Commissioner of Patents and Trademarks